United States Patent [19]

Igarashi et al.

[11] Patent Number: 5,246,991

[45] Date of Patent: Sep. 21, 1993

[54] POLYVINYL CHLORIDE RESIN COMPOSITION

[75] Inventors: Toshio Igarashi, Kyoto; Akira Wakatsuki, Ibaraki; Yuu Shida, Takatsuki, all of Japan

[73] Assignee: Sumitomo Chemical Company, Limited, Osaka, Japan

[21] Appl. No.: 802,703

[22] Filed: Dec. 5, 1991

Related U.S. Application Data

[63] Continuation of Ser. No. 527,734, May 23, 1990, abandoned.

[30] Foreign Application Priority Data

May 23, 1989 [JP] Japan .................. 1-130360

[51] Int. Cl.$^5$ .............................. C08K 5/34
[52] U.S. Cl. .................... 524/99; 524/100; 524/102
[58] Field of Search .............. 524/99, 100, 102

[56] References Cited

U.S. PATENT DOCUMENTS

| | | | |
|---|---|---|---|
| 3,547,874 | 12/1970 | Murayama et al. | 524/102 |
| 4,525,504 | 6/1985 | Morris et al. | 524/102 |
| 4,863,981 | 9/1989 | Gugumus | 524/102 |
| 4,957,954 | 9/1990 | Iizuka et al. | 524/102 |

OTHER PUBLICATIONS

F. Gugumus; "Antioxidantien"; *Carl Hanser Verlag, Munchen* pp. 1070–1073 (1987).

*Primary Examiner*—Kriellion S. Morgan
*Attorney, Agent, or Firm*—Wenderoth, Lind & Ponack

[57] ABSTRACT

A polyvinyl chloride resin containing blended therein a hindered amine light stabilizer having the following structural formula (I):

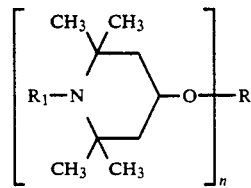

wherein each of $R_1$, $R_2$, $R_3$ and $R_4$ represents a lower alkyl group and $R_5$ represents an alkylene or terminal acetyl group, in an amount of 0.01–5 parts by weight based on 100 parts by weight of a polyvinyl chloride resin.

2 Claims, No Drawings

POLYVINYL CHLORIDE RESIN COMPOSITION

This application is a continuation of now abandoned application, Ser. No. 07/527,734 filed May 23, 1990.

The present invention relates to a polyvinyl chloride resin composition for molding articles for automobile use, etc.

Recently, there is a positive demand for interior covering materials of automobiles including crash pads, armrests, headrests, console boxes, meter hoods or door trims, to be of light weight and affluent sense of softness, and to have embossed and stitched patterns affluent in the sophisticated sense, for example.

Hitherto, these covering materials include vacuum-formed products of a plasticized sheet composed mainly of a polyvinyl chloride resin and ABS resin, and rotational-molded or slush-molded products of a plastisol compound composed mainly of a polyvinyl chloride resin and plasticizer (hereinafter referred to as sol molded product).

Although the vacuum-formed product meets the object in terms of reduction in weight, it is poor in a feeling of softness, and only those of a stiff touch are obtained. Further, it is difficult to fabricate into products of complicated shape having embossed or stitched patterns giving a feeling of high grade on the surface.

Further, the vacuum-formed product has a drawback that, because of its large residual strain on forming, cracks are easily formed during the use for a long time.

On the other hand, although the sol molded product has a feeling of softness, the sol, because of its low gelation temperature, rapidly melts in the mold, and phenomena such as flow mark, lip, stringiness of sol, etc. occur.

For this reason, the sol molded product has drawbacks that its inside surface lacks smoothness, discharge of the sol from the mold takes a too long time, and that the thickness of the covering material becomes large.

Further, the sol has also problems that a great deal of labor is required to clean tanks, pipes, etc. at the time of change of color, and that the viscosity changes with the lapse of time so that the sol cannot stand long-term storage.

In recent years, a powder molding method is attracting attention to solve these drawbacks and problems.

Generally, the powder molding method includes fluidized bed coating, electrostatic coating, powder flame spray coating, powder rotational molding, powder slush molding techniques and the like. Particularly, the powder rotational molding and powder slush molding techniques are suitable for producing covering materials for automobile interior parts.

This powder rotational molding or powder slush molding is a method in which, by rotating or shaking an assembled unit of a mold kept at a temperature of 180° C. or higher and a resin powder supply box, or jetting the resin powder into the mold, the resin powder is fusion-adhered to the inner surface of the mold, and the residual unfused powder is recovered automatically or forcedly into the box (Japanese Patent Kokai No. 132507/83).

As a method to heat the mold in such powder molding, there are method by using a gas furnace, method by circulating a heat medium oil, method by dipping into a heated medium oil or heated flowing sand, high-frequency induction heating method, etc. (Technical Publication, 1985-I, pages 84-91, of Sumitomo Chemical Company, Limited).

It is well known to produce a powdery composition by dry-blending a polyvinyl chloride resin with a plasticizer, stabilizer, pigment, etc. on a blender or high-speed rotating mixer equipped with a heating jacket.

The powdery resin composition to be used for the powder molding process mentioned above must be provided with satisfactory flowability and moldability. In particular, reflecting greater dimension and sophisticated quality of modern automobiles, shapes of crash pad, meter hood, etc. have become larger and more complex, and as a result, further improvement of flowability and moldability of powdery resinous composition is keenly urged.

In order to improve the flowability and moldability, it is also well known to add a finely powdered polyvinyl chloride resin and an inorganic filler such as finely powdered calcium carbonate, silica, etc. at the cooling step after completion of the dry-blending (Rubber Digest, Vol. 14, No. 8, pp. 32-40; Polyvinyl Chloride - Its Chemistry and Industry II, pp. 367-370, 1968; and Japanese Patent Publication No. 1575/1962).

Also, the composition of the present invention is used to produce automobile interior parts, etc., and in such application, the interior parts are frequently used in combination with urethane, so that it becomes necessary to prevent the interior parts from discoloration to be caused by an amine owing to the urethane. Consequently, it has been demanded to develop a polyvinyl chloride resin composition for powder molding excellent in the amine resistance. In this connection there have been proposed various methods such as those disclosed in Japanese Patent Kokai Nos. 161451/85, 91238/86, 270645/87 and 65157/89.

Reflecting recent growth of highly sophisticated automobiles, change of design and expanded area of the front glass for minimizing aerial resistance, and since the angle of the front glass becomes more close to be parallel with crash pad and meter hood, surface temperature of them rises, compared to the past, there is high requirement for thermal resistivity, resistivity to light and in particular, resistance against change in surface gloss or luster of these interior component materials.

A variety of methods have been proposed for improving resistivity against light ("Polyvinyl chloride, basis and application", 1988, published by Soft Giken, pages 310-325). These methods are to improve the discoloration property under exposure to light. Nevertheless, none of them has ever solved those problems mentioned above.

Luster or gloss generated by radiated light can be suppressed, and at the same time, discoloration can be lessened by adding hindered amine stabilizer (hereinafter sometimes referred to as HALS) to vinyl chloride resin. However, the addition of this stabilizer HALS generally causes coloration to occur on exposure to heat and the thermal resistivity is lowered. Furthermore, lamination of an article made from this composition to polyurethane resin foam would promote coloration.

The cause of such behavior of polyvinyl chloride resin composition under high temperature is not yet exactly known. However, it is probable that generation of salt formed as a result of reaction between hydrogen chloride generated from thermally affected polyvinyl chloride resin and HALS accounts for such behavior mentioned above.

The present invention has been accomplished as a result of our research work on light-and-heat stabilizer for concurrently preventing occurrence of luster and thermal discoloration from being accelerated on the surface of interior covering materials, made from polyvinyl chloride resin composition, of automobile use, etc., on exposure to light so that the requirement mentioned earlier can be satisfied.

Briefly, the invention relates to a polyvinyl chloride resin composition characterized by the fact that there is blended 0.01 to 5 parts by weight of hindered amine stabilizer represented by the structural formula (I):

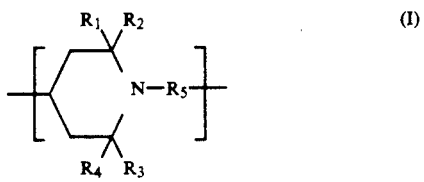

wherein each of $R_1$, $R_2$, $R_3$ and $R_4$ designates a lower alkyl group and $R_5$ designates either alkylene group or terminal acetyl group, based on 100 parts by weight of polyvinyl chloride resin.

Furthermore, the invention relates to a polyvinyl chloride resin composite for powder molding, characterized by the fact that there is blended 0.01 to 5 parts by weight of hindered amine stabilizer having the above structural formula (I) and a melting point or softening point of 120° C. or lower, based on 100 parts by weight of polyvinyl chloride resin.

The hindered amine stabilizer (HALS) to be used in this invention is characterized by having the structural formula (I). In the formula (I), each of $R_1$, $R_2$, $R_3$ and $R_4$ designates a lower alkyl group represented by methyl group, ethyl group or propyl group, preferably methyl group. $R_5$ designates either alkylene group or terminal acetyl group, preferably lower alkylene group having 2 or more carbon atoms.

Among conventionally available HALS, there are those wherein $R_5$ in the formula (I) is terminal group, and is hydrogen or methyl group. Although these conventional HALS are effective in the improvement of resistance against light, it has been found that none of them is sufficiently effective to prevent thermal coloration from occurrence.

Since softness is demanded for the articles molded from the polyvinyl chloride resin composition of this invention by powder molding, 10 to 120 parts by weight, preferably 50 to 80 parts by weight of plasticizer is added per 100 parts by weight of the vinyl chloride resin. In preparing the composition by dry blending it is necessary that the temperature of the composition be controlled in a range from 110° C. to 130° C. If the temperature is above 130° C., mutual fusion of pulverized particles occurs, as a result of which coarse particles are formed, thus resulting in the poor productivity. In order to allow HLS to properly work and prevent occurrence of adverse effect, it is most preferable to use HALS having a melting point or softening point of 120° C. or less and to cause sufficient absorption of HALS inside the vinyl chloride resin.

If HALS having a melting point (or softening point) of 120° C. or higher is used it will hardly be absorbed inside the vinyl chloride resin, thus resulting in the surface adhesion. If this occurs, the stabilizer remains on the surface even after being shaped into final articles. This would give satisfactory resistivity against light. However, since the surface is thermally affected while the molding or heat-resistance test is conducted, the surface adhered stabilizer would easily react with hydrogen chloride generated from the polyvinyl chloride resin, thus promoting discoloration.

According to this invention HALS is used in an amount of 0.01 to 5 parts by weight, desirably 0.05 to 3 parts by weight, more desirably 0.1-1 part by weight, based on 100 parts by weight of vinyl chloride resin. If less than 0.01 part by weight of HALS is used, proper effect thereof cannot be obtained. This in turn would cause luster to occur when exposed to light. Conversely, if more than 5 parts by weight is added, correspondingly higher effect is not enough, it merely results in the waste of cost, and yet, the thermal resistance and the fastness to discoloration would be slightly lowered, and, therefore, neither of these is desirable.

The polyvinyl chloride resin or vinyl chloride resin to be used in the present invention includes those which are produced by suspension polymerization, bulk polymerization or emulsion polymerization, and for example there may be mentioned vinyl chloride polymers, copolymers of vinyl chloride with a compound copolymerizable therewith such as ethylene, propylene, vinyl acetate, alkyl acrylate, alkyl methacrylate, etc., graft copolymers of an ethylene/vinyl acetate copolymer with vinyl chloride, and mixtures of two or more of them. However, the polyvinyl chloride resin to be used in the present invention is not limited to these particular resins.

The plasticizer to be used in the present invention includes phthalic esters such as di-2-ethylhexyl phthalate, diisodecyl phthalate, diisoundecyl phthalate, di($C_9$–$C_{11}$)alkyl phthalates, etc., and trimellitic esters such as trioctyl trimellitate, tri-2-ethylhexyl trimellitate, tridecyl trimellitate, tri($C_7$–$C_9$ or $C_7$–$C_{11}$)alkyl trimellitates, etc., and pyromellitates such as tetra-2-ethylhexyl pyromellitate, tetraoctyl pyromellitate, tetraalkyl($C_7$–$C_9$)pyromellitate, etc.

Although the amount of the plasticizer to be blended is not critical it is generally used in an amount of 10–120 parts by weight, preferably 50–80 parts by weight per 100 parts by weight of the polyvinyl chloride resin.

Further, it is also possible that the composition of this invention contains a small amount of an epoxy stabilizer, polyester stabilizer, etc. The plasticizers to be used in the present invention, however, are not limited thereto.

If desired, the polyvinyl chloride resin composition may further contain a stabilizer.

The stabilizers to be used in this invention include metal compounds of zinc, barium, sodium, potassium, calcium, lithium, tin, etc. e.g. carboxylic acid salts of these metals, among which mixtures of zinc salt and barium salt are preferable.

It is also possible to use, in addition to the above stabilizers, such other stabilizers as magnesium oxide, magnesium hydroxide, hydrotalcite compounds, zinc oxide, barium oxide, calcium oxide, barium phosphate, etc.

Further it is also possible to use phenolic and thioether antioxidants, phosphites, diketo compounds, ultraviolet absorbers such as salicylic acid esters, benzophenone compounds and benzotriazole compounds, epoxy compounds such as epoxidized soybean oil, those synthesized from bisphenol A and epichlorohydrin. Particularly, the combined use of a mixed salt of zinc and barium with hydrotalcite compound is preferable as it would improve the heat resistance when a polyurethane is adhered or laminated.

The powdery polyvinyl chloride resin of this invention may be blended, in addition to the plasticizer and stabilizer, with pigment, filler, foaming agent and other auxiliary agents in accordance with necessity.

The expression "100 parts by weight of polyvinyl chloride resin or vinyl chloride resin" or the like means the total of the amount of the polyvinyl resin before the dry blending and the amount of the fine particles of polyvinyl chloride resin to be added after the dry blending.

The present invention will be more concretely described as follows by means of Examples and Comparative Examples, but it should be understood however that the scope of the invention is not limited to these particular Examples.

1. Hindered amine light stabilizer (HALS)

The names structural formulas, molecular weights and melting points (or softening points) of hindered amine light stabilizers used in the Examples of the invention and Comparative Examples are indicated below.

(A) Polycondensate of dimethyl succinate and 1-(2-hydroxyethyl)-4-hydroxy-2,2,6,6-tetramethylpiperidine (TINUVIN® 622LD, product of Ciba Geigy, S.A.)

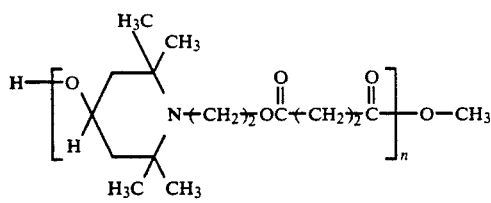

Molecular weight: 3,000 or higher
Softening point: 55° through 70° C.

(B) Bis(2,2,6,6-tetramethyl-4-piperidyl)sebacate (SANOL® LS-770, product of Sankyo Co., Ltd.)

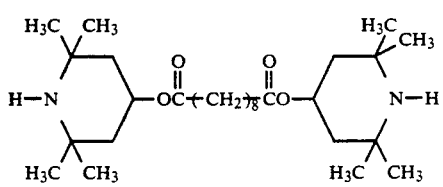

Molecular weight: 481
Melting point: 81°-86° C.

(C) Poly[[6-(1,1,3,3-tetramethylbutyl)imino-1,3,5-triazine-2,4-diyl][(2,2,6,6-tetramethyl-4-piperidyl)imino]]hexamethylene[(2,2,6,6-tetramethyl-4-piperidyl)imino]] (CHIMASSORB® 944LD, product of Ciba Geigy, S.A.)

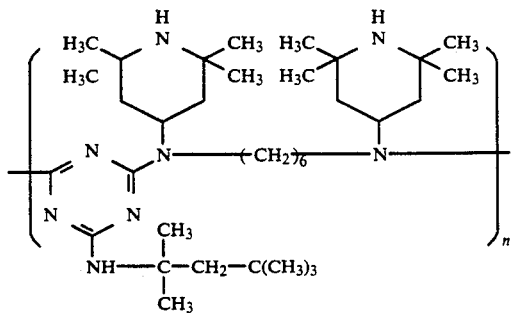

Molecular weight: 2,500 or higher
Softening point: 100°-135° C.

(D) 1,2,2,6,6-pentamethyl-4-piperidyl/tridecyl(mixed)-1,2,3,4-butantetracarboxylate (Mark LA-62, product of Adeka-Argus)

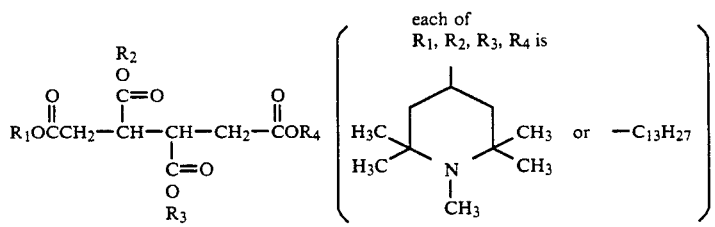

Molecular weight: about 900
Liquid compound (E) 2-(3,5-di-t-butyl-4-hydroxybenzyl)-2-n-butyl malonic acid bis(1,2,2,6,6-pentamethyl-4-piperidyl) (TINUVIN® 144, product of Ciba Geigy, S.A.)

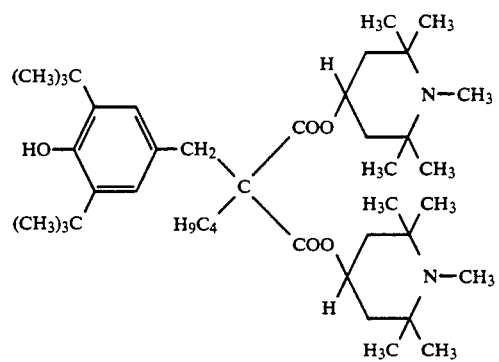

Molecular weight: 685
Melting point: 146°-150° C.

(F) 1,[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine (SANOL® LS-2626, product of Sankyo Co., Ltd.)

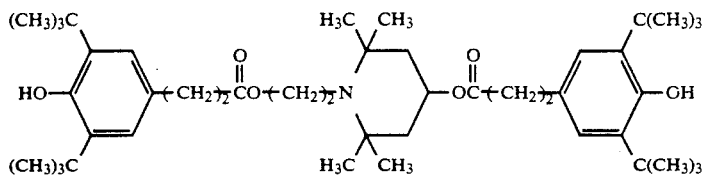

Molecular weight: 722
Melting point: 135°–140° C.
(G) 8-acetyl-3-dodecyl-7,7,9,9-tetramethyl-1,3,8-triazaspyro[4,5]decane-2,4-dion (SANOL® LS-440, product of Sankyo Co., Ltd.)

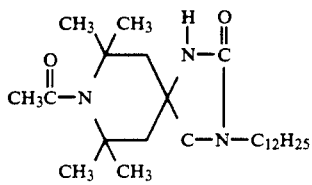

Molecular weight: 436
Melting point: 75°–77° C.

2. Preparation of resinous composition for powder molding
Composition

| | |
|---|---|
| Polyvinyl chloride resin (polymerization degree: 800) [SUMILIT ® Sx-8G, product of Sumitomo Chem. Co., Ltd.] | 90 parts by weight |
| Fine particles of polyvinyl chloride resin (polymerization degree: 1,300) [SUMILIT ® Px-Q, product of Sumitomo Chem. Co., Ltd.] | 10 parts by weight |
| Plasticizer DIDP (diisodecylphthalate) | 70 parts by weight |
| Ba/Zn stabilizer | 3 parts by weight |
| Epoxidized soybean oil | 2 parts by weight |
| Pigment | Optimum amount |
| Light stabilizer (kinds and added amounts are shown in Table 1) | |

First, the polyvinyl chloride resin (SUMILIT ® Sx-8G) obtained by the usual suspension polymerization was charged in a super mixer. Then, the mixer was stirred at a constant rotation speed while applying heat. When the temperature of the resin reached 80° C., there were added plasticizer, stabilizer, epoxidized soybean oil, pigment and light stabilizer, and dry-blending was conducted. When the temperature of the blend reached 120° C., the blend was cooled to a temperature below 50° C., and then fine particles of polyvinyl chloride resin (SUMILIT ® Px-Q) were uniformly dispersed therein to obtain resin composite for powder molding.

3. Production of powder-molded sheet and evaluation:

First, a nickel plane mold was heated to 230° C. in a thermal furnace of 280° C. Then, there was poured and spread the powdery composition on the heated mold to cause fuse adhering to the mold for 10 seconds. Then unmolten powder was discharged, and the mold adhered with melted powder was heated again in the furnace of 280° C. for a minute.

The molded thus obtained was placed on a plate for urethane foaming and then injected thereon a urethane material prepared from Polymeric MDI, polyol, etc. to eventually obtain a polyurethane-adhered sheet having 10 mm of thickness.

(1) Evaluation of thermal resistivity:

The polyurethane-adhered sheet obtained as above was placed in a Gear-oven containing heated atmosphere of 110° C., and then performed aging test every 100 hours to 400 hours and 800 hours. Using the SM color computer model SM-4 (product of Suga Laboratory Equipment Co., Ltd.), the rate of discoloration $\Delta E$ was measured by referring to the reference sample sheet which was not subjected to the aging.

The values $\Delta E$ thus obtained were classified as follows:

| | | |
|---|---|---|
| $\Delta E =$ | 0–0.5 | rating 5 (best) |
| | 0.6–1.2 | 5–4 |
| | 1.3–1.9 | 4 |
| | 2.0–2.6 | 4–3 |
| | 2.7–3.9 | 3 |
| | 4.0–5.4 | 3–2 |
| | 5.5–7.6 | 2 |
| | 7.7–10.7 | 2–1 |
| | >10.8 | 1 (worst) |

The results of the measurement are shown in Table 1.

(2) Evaluation of light resistance:

The polyurethane-adhered sheet was placed in an U.V. fade-o-meter with black panels of 83° C., and then aging test was conducted every 100 hours to 400 hours and 800 hours. In the same way as was done for the evaluation of thermal resistivity (1) $\Delta E$ was measured and rating was determined. Using digital variable-angle gloss meter model UGV-5K (product of Suga Laboratory Equipment Co., Ltd.) and by respectively setting the light incident angle and light-reception angle at 60° C., gloss or luster was determined. The lower the surface gloss rating value, the lower in gloss or luster or more preferable. The results are also shown in Table 1.

TABLE 1

| | Examples | | | | Comparative examples | | | | |
|---|---|---|---|---|---|---|---|---|---|
| | 1 | 2 | 3 | 4 | 1 | 2 | 3 | 4 | 5 |
| Kinds (reference code) of light stabilizer | A | A | F | G | — | B | C | D | E |
| Added amount (party by weight) | 0.2 | 1.0 | 0.2 | 0.2 | — | 0.2 | 0.2 | 0.2 | 0.2 |
| Thermal discoloration rating | | | | | | | | | |
| 100 hours | 5 | 5 | 5 | 5 | 5 | 4 | 5–4 | 4 | 4 |
| 200 | 5–4 | 5–4 | 4 | 5–4 | 5–4 | 3 | 3 | 3 | 3 |
| 300 | 4 | 4 | 4–3 | 4 | 4 | 3 | 3 | 3 | 3 |

TABLE 1-continued

|  | Examples | | | | Comparative examples | | | | |
| --- | --- | --- | --- | --- | --- | --- | --- | --- | --- |
|  | 1 | 2 | 3 | 4 | 1 | 2 | 3 | 4 | 5 |
| 400 | 4 | 4–3 | 4–3 | 4 | 4 | 3 | 3 | 3 | 3 |
| 800 | 4–3 | 4–3 | 3 | 4–3 | 4–3 | 2–1 | 2 | 2–1 | 2–1 |
| Light-exposed discoloration rating | | | | | | | | | |
| 100 hours | 5 | 5 | 5 | 5 | 5–4 | 5–4 | 5 | 5 | 5 |
| 200 | 5–4 | 5–4 | 5–4 | 5–4 | 4 | 5–4 | 5 | 5 | 5–4 |
| 300 | 5–4 | 5–4 | 5–4 | 5–4 | 4–3 | 4 | 5–4 | 5–4 | 5–4 |
| 400 | 4 | 4 | 4 | 4 | 3 | 4–3 | 5–4 | 5–4 | 4 |
| 800 | 4 | 4 | 4 | 4 | 2 | 3 | 4 | 4 | 4 |
| Surface gloss rating | | | | | | | | | |
| 0 hour | 1.2 | 1.2 | 1.2 | 1.2 | 1.2 | 1.2 | 1.2 | 1.2 | 1.2 |
| 100 | 1.2 | 1.2 | 1.2 | 1.2 | 1.2 | 1.3 | 1.2 | 1.2 | 1.2 |
| 200 | 1.3 | 1.2 | 1.2 | 1.3 | 1.3 | 1.4 | 1.2 | 1.2 | 1.2 |
| 300 | 1.4 | 1.3 | 1.3 | 1.4 | 2.1 | 1.6 | 1.2 | 1.3 | 1.2 |
| 400 | 1.5 | 1.3 | 1.3 | 1.5 | 3.0 | 1.9 | 1.3 | 1.3 | 1.3 |
| 800 | 1.7 | 1.5 | 1.6 | 1.8 | 4.0 | 3.0 | 1.4 | 1.4 | 1.5 |

What we claim is:

1. A polyvinyl chloride resin composition having blended therein a hindered amine light stabilizer selected from the group consisting of a polycondensate of dimethyl succinate and 1-(2-hydroxyethyl)-4-hydroxy-2,2,6,6-tetramethylpiperidine, 1-[2-[3-(3,5-di-t-butyl-4-hydroxyphenyl)propionyloxy]-ethyl]-4-[3-(3,5-di-t-butyl-4-hydroxyphenyl)propionyloxy]-2,2,6,6-tetramethylpiperidine, and 8-acetyl-3-dodecyl-7,7,9,9-tetramethyl-1,3,8-triazaspyro[4,5]decane-2,4-dion in an amount of 0.01–5 parts by weight based on 100 parts by weight of the polyvinyl chloride resin.

2. A polyvinyl chloride resin composition for powder molding characterized in that there is blended therein a hindered amine light stabilizer selected from the group consisting of a polycondensate of dimethyl succinate and 1-(2-hydroxyethyl)-4-hydroxy-2,2,6,6-tetramethylpiperidine, 1-[2-[3-(3,5-di-t-butyl-4-hydroxyphenyl)propionyloxy]-ethyl]-4-[3-(3,5-di-t-butyl-4-hydroxyphenyl)propionyloxy]-2,2,6,6-tetramethylpiperidine, and 8-acetyl-3-dodecyl-7,7,9,9-tetramethyl-1,3,8-triazaspyro[4,5]decane-2,4-dion, said hindered amine light stabilizer having a melting point or softening point of not higher than 120° C. and wherein said hindered light stabilizer is present in an amount of 0.01–5 parts by weight based on 100 parts by weight of the polyvinyl chloride resin.

* * * * *